(12) United States Patent
Lee et al.

(10) Patent No.: US 12,148,177 B2
(45) Date of Patent: Nov. 19, 2024

(54) METHOD AND APPARATUS WITH VANISHING POINT ESTIMATION

(71) Applicant: Samsung Electronics Co., Ltd., Suwon-si (KR)

(72) Inventors: Byeongju Lee, Seoul (KR); Seho Shin, Seoul (KR); Sung Hyun Chung, Osan-si (KR); Jinhyuk Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 17/525,183

(22) Filed: Nov. 12, 2021

(65) Prior Publication Data

US 2022/0383529 A1 Dec. 1, 2022

(30) Foreign Application Priority Data

May 28, 2021 (KR) .......................... 10-2021-0069004

(51) Int. Cl.
*G06T 7/536* (2017.01)
*G06T 7/73* (2017.01)
*G06V 20/58* (2022.01)

(52) U.S. Cl.
CPC .............. *G06T 7/536* (2017.01); *G06T 7/73* (2017.01); *G06V 20/58* (2022.01)

(58) Field of Classification Search
CPC . G06T 7/536; G06T 7/73; G06T 2207/10016; G06T 2207/30252; G06T 7/277; G06T 2210/12; G06V 20/58; G06V 2201/08; G06V 20/584; G06F 18/24

USPC ......................................................... 382/103
See application file for complete search history.

(56) References Cited

U.S. PATENT DOCUMENTS

| 8,396,299 | B2 | 3/2013 | Sakurai |
| 9,098,750 | B2 * | 8/2015 | Azuma ................. G06V 20/56 |
| 10,872,431 | B2 | 12/2020 | Stein et al. |

(Continued)

FOREIGN PATENT DOCUMENTS

| CN | 111391825 A | 7/2020 |
| CN | 112348752 A | 2/2021 |

(Continued)

OTHER PUBLICATIONS

Jo, Youngran, et al. "Vanishing Point Estimation Using Feature Motion in Moving Camera Image" *The HCI Society of Korea* http://www.dbpia.eo.kr/journal/artieleDetail?nodeId=NODE07122419 Feb. 2017 (1 page in English, 4 pages in Korean).

(Continued)

*Primary Examiner* — Ali Bayat
(74) *Attorney, Agent, or Firm* — NSIP Law

(57) ABSTRACT

A method with vanishing point estimation includes: obtaining an image of a current time point of objects comprising a target vehicle; detecting the objects in the image of the current time point; tracking positions of the objects in a world coordinate system by associating the objects with current position coordinates of the objects determined from images of previous time points that precede the current time point; determining a vanishing point for each of the objects based on the positions of the objects; and outputting the vanishing point determined for each of the objects.

24 Claims, 10 Drawing Sheets

(56) References Cited

U.S. PATENT DOCUMENTS

| | | | |
|---|---|---|---|
| 2009/0067675 A1* | 3/2009 | Tan | G01S 13/931 |
| | | | 382/104 |
| 2010/0098295 A1* | 4/2010 | Zhang | G08G 1/167 |
| | | | 348/148 |
| 2015/0086080 A1* | 3/2015 | Stein | H04N 7/183 |
| | | | 382/104 |
| 2015/0302591 A1 | 10/2015 | Kim et al. | |
| 2016/0267678 A1* | 9/2016 | Cleveland | G06T 7/246 |
| 2019/0303684 A1* | 10/2019 | Khadloya | G07C 9/00896 |
| 2019/0370997 A1* | 12/2019 | Hou | G06V 20/56 |
| 2020/0014898 A1 | 1/2020 | Imai | |
| 2020/0175326 A1 | 6/2020 | Shen et al. | |

FOREIGN PATENT DOCUMENTS

| | | |
|---|---|---|
| JP | 3358247 B2 | 12/2002 |
| JP | 4935504 B2 | 5/2012 |
| KR | 10-1549165 B1 | 9/2015 |
| KR | 10-1724868 B1 | 4/2017 |
| KR | 10-2018-0074568 A | 7/2018 |
| KR | 10-2018-0081966 A | 7/2018 |
| KR | 10-2020-0045701 A | 5/2020 |
| KR | 10-2021-0017525 A | 2/2021 |

OTHER PUBLICATIONS

Lee, Kyu-Yeol, et al. "Vanishing Point Estimation Using Dynamic Foreground Object" *Korea Broadcasting Media Engineering Society* https://scholarworks.unist.ac.kr/handle/201301/37844 Feb. 8, 2018 (1 page in English, 3 pages in Korean).

\* cited by examiner

METHOD AND APPARATUS WITH VANISHING POINT ESTIMATION

CROSS-REFERENCE TO RELATED APPLICATIONS

This application claims the benefit under 35 USC § 119(a) of Korean Patent Application No. 10-2021-0069004 filed on May 28, 2021, in the Korean Intellectual Property Office, the entire disclosure of which is incorporated herein by reference for all purposes.

BACKGROUND

1. Field

The following description relates to a method and apparatus with vanishing point estimation.

2. Description of Related Art

A vanishing point identified in an image may be generally used to correct an image captured by a camera provided in a vehicle or track an object in the image. A vanishing point may be estimated by multiple straight lines such as road lanes detected in a field of view (FOV) of a camera capturing an image. However, at an intersection where a lane leading forward disappears, it may not be easy to detect a sufficient number of straight lines to be used to estimate a vanishing point. In addition, lanes on straight roads on flat ground and on a slope may differ in their vanishing points, and such a difference may be found in images captured by a camera provided in a vehicle. The difference in vanishing point may also be found when a vehicle is tilted by a suspension during actual driving or when the ground is not flat. Thus, accurate object tracking may not be readily performed as a difference in vanishing point for each position of an object may not be considered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with vanishing point estimation includes: obtaining an image of a current time point of objects comprising a target vehicle; detecting the objects in the image of the current time point; tracking positions of the objects in a world coordinate system by associating the objects with current position coordinates of the objects determined from images of previous time points that precede the current time point; determining a vanishing point for each of the objects based on the positions of the objects; and outputting the vanishing point determined for each of the objects.

The detecting of the objects may include: classifying a type of the target vehicle; and detecting the target vehicle in the image of the current time point based on the classified type.

The detecting of the target vehicle may include: determining a bounding box corresponding to a rear of the target vehicle based on the classified type; and detecting the target vehicle using the bounding box.

The determining of the bounding box may include: retrieving prestored width information corresponding to the classified type; and generating the bounding box corresponding to a width of the target vehicle based on the width information.

The tracking of the positions of the objects may include: predicting positions of second bounding boxes corresponding to the determined current position coordinates using a Kalman filter; matching first bounding boxes corresponding to the objects and the second bounding boxes; and tracking the positions of the objects in the world coordinate system based on a result of the matching.

The Kalman filter may be used to determine a position of a second bounding box corresponding to current position coordinates of the target vehicle by predicting the current position coordinates of the target vehicle and a speed in x and y directions of the target vehicle based on a measurement value comprising a width of the target vehicle in the image of the current time point and a distance in a horizontal direction from a center of the width.

The determining of the vanishing point may include determining a vanishing point of an object among the objects based on a relationship between a position of a first bounding box corresponding to the object, a height of a camera capturing the image of the objects, and a position of a third bounding box corresponding to the object in an image plane.

The outputting of the vanishing point further may include projecting and displaying the objects onto the image of the current time point by the vanishing point determined for each of the objects.

The method may include: calculating a distance between the vanishing point for each of the objects and each of the objects, based on the vanishing point determined for each of the objects; and outputting the calculated distance.

The method may include generating driving assistance information corresponding to each of the objects based on the vanishing point determined for each of the objects.

The generating of the driving assistance information may include: calculating a distance between the vanishing point for each of the objects and each of the objects, based on the vanishing point determined for each of the objects; and generating the driving assistance information comprising a driving line and a driving lane of each of the objects based on the calculated distance.

In another general aspect, one or more embodiments include a non-transitory computer-readable storage medium storing instructions that, when executed by a processor, configure the processor to perform any one, any combination, or all operations and methods described herein.

In another general aspect, an apparatus with vanishing point estimation includes: a sensor configured to capture an image of a current time point of objects comprising a target vehicle; a processor configured to detect the objects in the image of the current time point, track positions of the objects in a world coordinate system by associating the objects with current position coordinates of the objects determined from images of previous time points that precede the current time point, and determine a vanishing point for each of the objects based on the positions of the objects; and a display configured to output the vanishing point determined for each of the objects.

For the detecting of the objects, the processor may be configured to: classify a type of the target vehicle; and detect the target vehicle in the image of the current time point based on the classified type.

For the detecting of the target vehicle, the processor may be configured to: determine a bounding box corresponding to a rear of the target vehicle based on the classified type; and detect the target vehicle using the bounding box.

For the determining of the bounding box, the processor may be configured to: retrieve prestored width information corresponding to the classified type; and generate the bounding box corresponding to a width of the target vehicle based on the width information.

For the tracking of the positions of the objects, the processor may be configured to: predict positions of second bounding boxes corresponding to the determined current position coordinates using a Kalman filter; match first bounding boxes corresponding to the objects and the second bounding boxes; and track the positions of the objects in the world coordinate system based on a result of the matching.

The Kalman filter may be used to determine a position of a second bounding box corresponding to current position coordinates of the target vehicle by predicting the current position coordinates of the target vehicle and a speed in x and y directions of the target vehicle based on a measurement value comprising a width of the target vehicle in the image of the current time point and a distance in a horizontal direction from a center of the width.

For the determining of the vanishing point, the processor may be configured to determine a vanishing point of an object among the objects based on a relationship between a position of a first bounding box corresponding to the object, a height of a camera capturing the image of the objects, and a position of a third bounding box corresponding to the object in an image plane.

For the outputting of the vanishing point, the processor may be configured to project the objects onto the image of the current time point by the vanishing point determined for each of the objects, and the display may be configured to display the projected objects.

In another general aspect, a method with vanishing point estimation includes: determining a lower edge of bounding box of an object in an image; determining a position of the object in a world coordinate system based on the lower edge of the bounding box; determining a vanishing point of the object based on the lower edge of the bounding box and the position of the object in the world coordinate system; and outputting the vanishing point of the object.

The determining of the lower edge may include determining coordinates of a lower center of the bounding box, and the determining of the vanishing point of the object may include determining a position of the vanishing point in a vertical direction based on the coordinates of the lower center of the bounding box, the position of the object in the world coordinate system, and one or more intrinsic parameters of a camera used to obtain the image.

The determining of the position of the object in the world coordinate system may include: matching the bounding box and a second bonding box; and determining the position of the object in the world coordinate system based on a result of the matching.

The bounding box may be generated by classifying a type of the object, and the second bounding box may be generated using a Kalmann filter.

Other features and aspects will be apparent from the following detailed description, the drawings, and the claims.

Figure 1A:
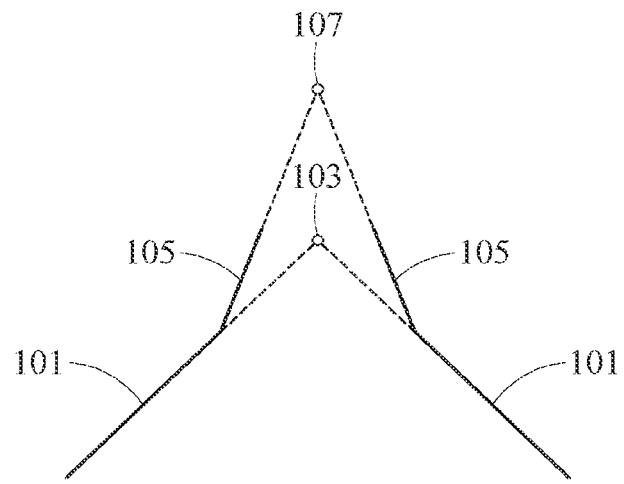
FIGS. 1A and 1B illustrate examples of an error between results of object tracking occurring due to a difference in vanishing point.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1B:
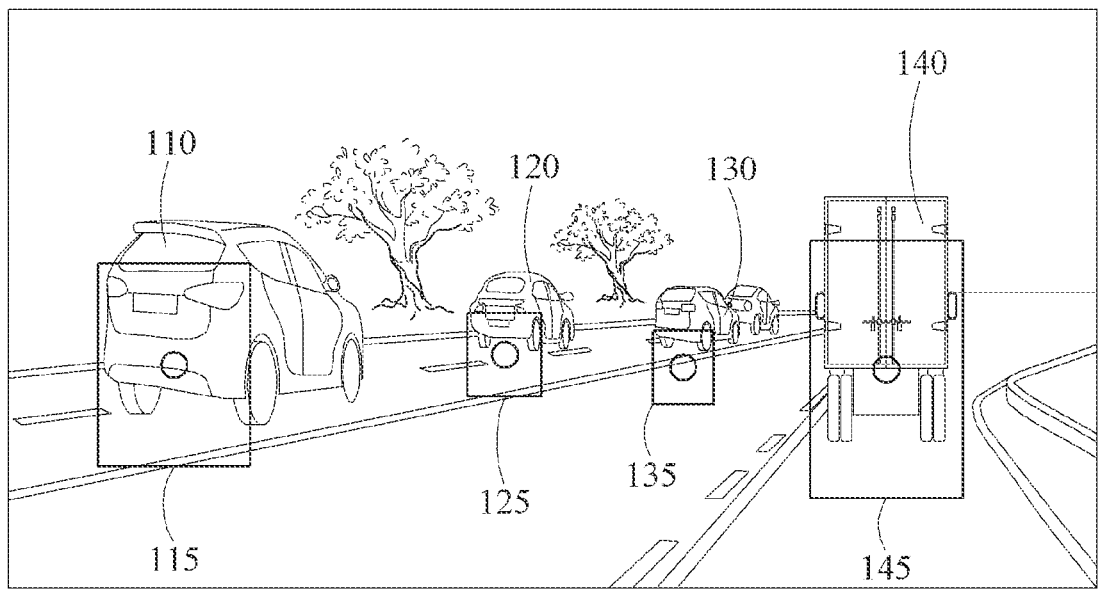

FIGS. 1A and 1B illustrate examples of an error between results of object tracking occurring due to a difference in vanishing points. FIG. 1A illustrates an example of a difference in vanishing points based on a slope of the ground, and FIG. 1B illustrates an example of a result of tracking objects using one consistent vanishing point even for a sloping road.

For example, when the ground is not flat but sloping, a vanishing point may change based on a position of an object. Referring to FIG. 1A, a position of a first vanishing point 103 corresponding to a road 101 with a first gradient and a position of a second vanishing point 107 corresponding to a road 105 with a second gradient may be different from each other. That is, when roads on which vehicles travel have different gradients, positions of vanishing points respectively corresponding to positions of the vehicles may also be different.

For example, as illustrated in FIG. 1B, objects (for example, vehicles 110, 120, 130, and 140) may be tracked using one consistent vanishing point.

In this example, by displaying the objects by projecting a tracking result in a world coordinate system onto an image plane (non-limiting example to be described hereinafter) without considering a difference or change in vanishing point based on positions of the objects, bounding boxes 115, 125, 135, and 145 from which the vehicles 110, 120, 130, and 140 are to be detected respectively may be projected at inaccurate positions.

The bounding boxes 115 through 145 projected at the inaccurate positions may degrade accuracy in estimating distances to the vehicles 110, 120, 130, and 140, and/or prevent the vehicles 110, 120, 130, and 140 from being accurately tracked.

Figure 2:
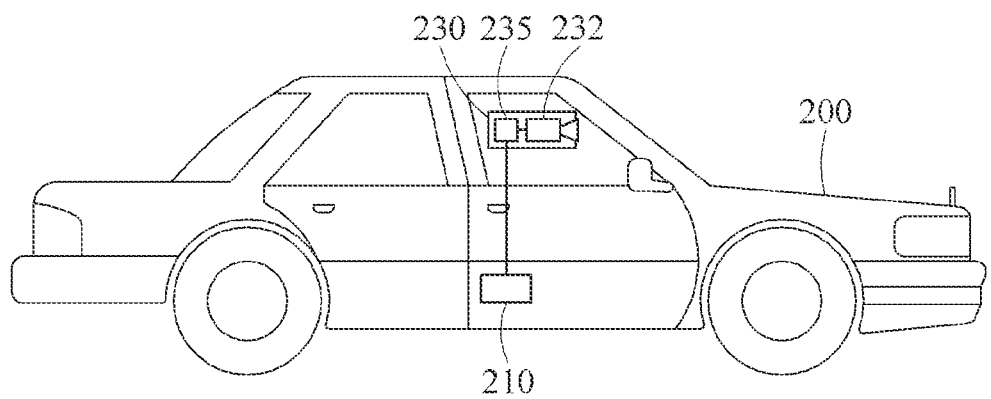
FIG. 2 illustrates an example of a host vehicle including a vanishing point estimation apparatus.

FIG. 2 illustrates an example of a host vehicle including a vanishing point estimation apparatus. In the example of FIG. 2, illustrated is a side view of a host vehicle 200.

The host vehicle 200 may correspond to a vehicle in which a vanishing point estimation apparatus 230 is provided. The host vehicle 200 may also be referred to as, for example, an ego-vehicle, a self-vehicle, and/or an autonomous driving vehicle. The host vehicle 200 may include a vehicle controller 210 and the vanishing point estimation apparatus 230. In one or more non-limiting examples, the vanishing point estimation apparatus 230 may be the host vehicle 200 (e.g., including the vehicle controller 210).

The vehicle controller 210 may control overall driving or traveling of the host vehicle 200. For example, the vehicle controller 210 may receive vanishing point information and/or driving assistance information received from the vanishing point estimation apparatus 230, and process an image or control the driving including, for example, a speed and a steering angle, of the host vehicle 200 based on the received information.

The vanishing point estimation apparatus 230 may include a camera 232 and an image signal processor (ISP) 235. The camera 232 may correspond to, for example, a camera device 710 in FIG. 7 or a sensor 810 in FIG. 8. The ISP 235 may correspond to, for example, a processor 830 in FIG. 8.

The camera 232 may be provided in the host vehicle 200 or the vanishing point estimation apparatus 230 and capture an image of the outside of the host vehicle 200. For example, the camera 232 may generate an image by converting light of an external environment in various directions (e.g., front, left, and right, etc.) outside the host vehicle 200 into electrical energy and transmit the generated image to the ISP 235.

The camera 232 may also be provided in an electronic apparatus other than the vanishing point estimation apparatus 230 or implemented in a separate electronic apparatus. The electronic apparatus may be implemented as, for example, a personal computer (PC), an Internet of Things (IoT) device, and/or a portable electronic device. The portable electronic device may be, for example, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and/or the like, but examples of which may not be limited thereto.

The ISP 235 may recognize vehicles around the host vehicle 200 based on an image obtained from the camera 232, track positions of the vehicles, and estimate a vanishing point for each of the vehicles. A vehicle around the host vehicle 200 may be referred to herein as a target vehicle. The target vehicle may be at least one vehicle among other vehicles excluding the host vehicle 200. In an example, the target vehicle may be a vehicle that is included in an image captured by the camera 232 included in the vanishing point estimation apparatus 230 and is a target for which a vanishing point is to be estimated.

For example, the ISP 235 may recognize a target vehicle among a plurality of objects included in an image obtained from the camera 232 and generate a bounding box for detecting the recognized target vehicle. Although to be described in detail hereinafter, the ISP 235 may track a position of a lower center point of the rear of the target vehicle included in the bounding box.

Terminologies used herein are defined as follows.

A full width may refer to a horizontal length, or a width, of a vehicle. The full width may correspond to a horizontal length of a vehicle when it is observed from behind. A full height may refer to a vertical length, or a height, of a vehicle. The full height may correspond to a vertical length from the ground in contact with the vehicle to a top (e.g., a top cover) of the vehicle. For example, the camera 232 of the vanishing point estimation apparatus 230 may be disposed at the top cover of the host vehicle 200. In such an example, a height of the camera 232 may correspond to the full height.

Figure 3:
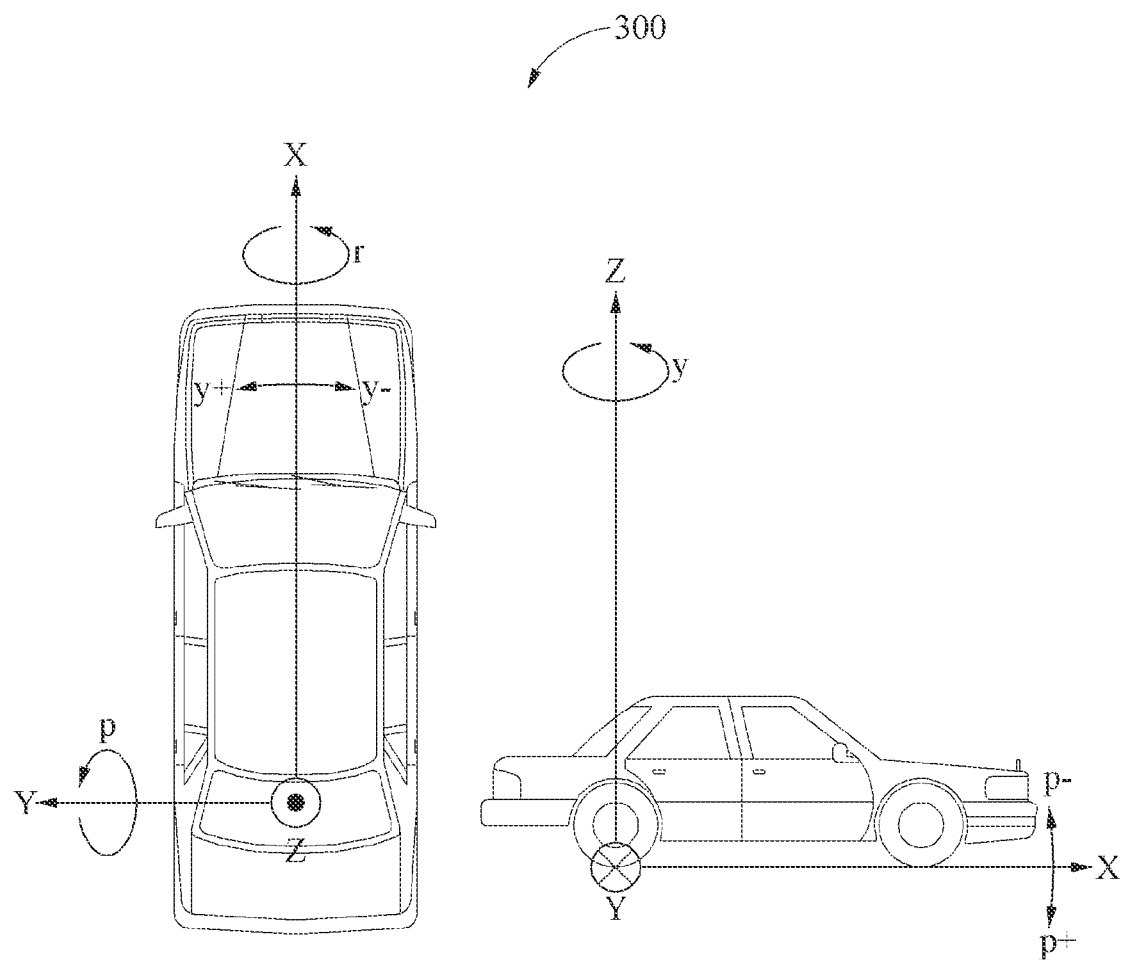
FIG. 3 illustrates an example of a vehicle coordinate system.

FIG. 3 illustrates an example of a vehicle coordinate system. Referring to FIG. 3, a tracking result in a world coordinate system may be indicated in a vehicle coordinate system 300. The tracking result in the world coordinate system may be indicated as a point in the vehicle coordinate system 300. The tracking result in the world coordinate system may refer to a result of tracking of objects in the world coordinate system corresponding to a position of the rear of a target vehicle to be tracked in the vehicle coordinate system 300.

The world coordinate system may refer to a coordinate system used to represent a real world corresponding to an environment outside a camera of a vanishing point estimation apparatus. For example, when the camera of the vanishing point estimation apparatus is set to be an origin, the world coordinate system may be referred to as a camera coordinate system.

The camera coordinate system or the world coordinate system in which the camera of the vanishing point estimation apparatus is set as the origin may have an x-axis, a y-axis, and a z-axis. For example, the x-axis may correspond to a front direction in which the camera faces (e.g., of a front side of the camera), the y-axis may correspond to a left direction based on the front side of the camera, and the z-axis may correspond to an upper direction based on the front side of the camera.

Figure 4:
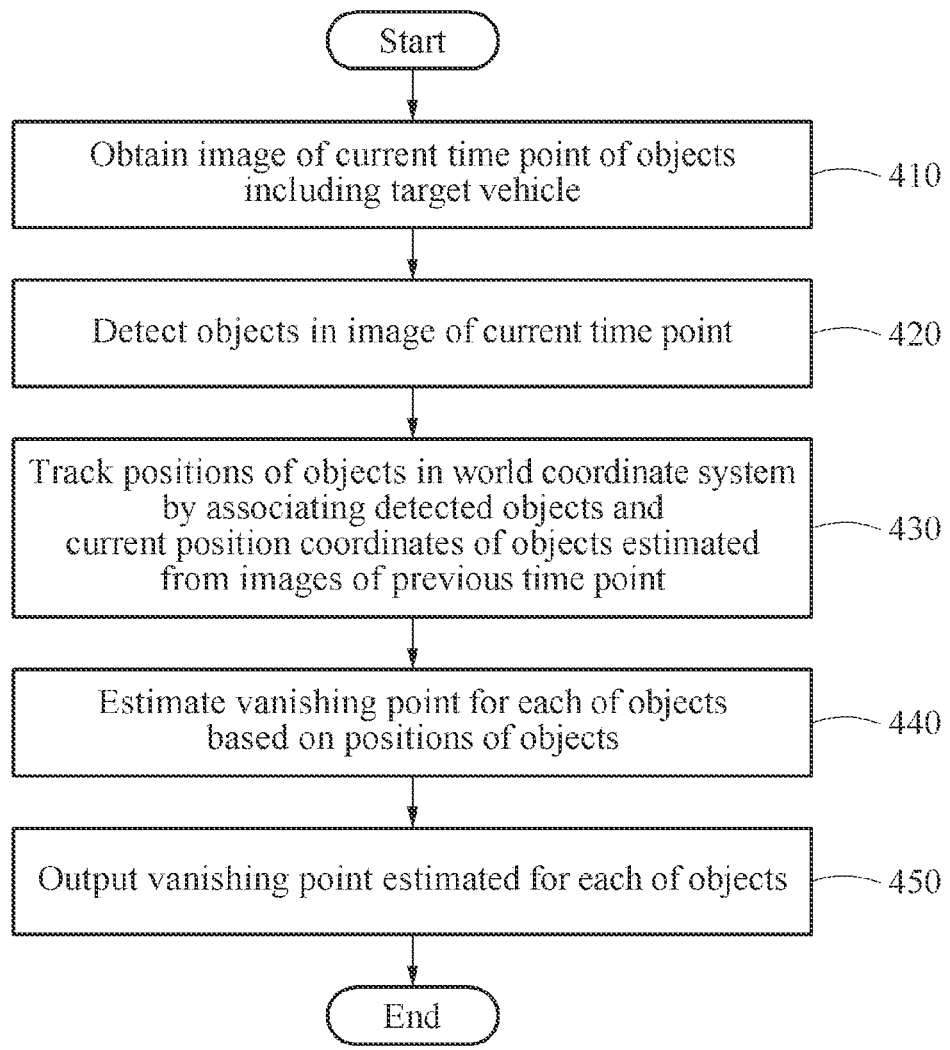
FIG. 4 illustrates an example of a vanishing point estimation method.

FIG. 4 illustrates an example of a vanishing point estimation method. A vanishing point estimation apparatus, which is an apparatus for estimating a vanishing point, may estimate a vanishing point for each of objects and output the estimated vanishing point by performing operations 410 through 450 to be described hereinafter with reference to FIG. 4. The example of FIG. 4 will be described using a captured image of a target vehicle located in front of a host vehicle for the convenience of description. However, the following description may also be applied to a target vehicle located behind the host vehicle.

In operation 410, the vanishing point estimation apparatus may obtain an image of a current time point of objects including a target vehicle. For example, the vanishing point estimation apparatus may capture the image of the objects including the target vehicle in front using a camera or a sensor and obtain an image of vehicles in front at the current time point. The size of the image of the target vehicle obtained through the camera may change based on a distance between the camera and the target vehicle.

In operation 420, the vanishing point estimation apparatus may detect the objects from the image of the current time point obtained in operation 410. The vanishing point estimation apparatus may classify the objects, or the target vehicle, by type. For example, the vanishing point estimation apparatus may classify a type of the target vehicle (for example, whether the target vehicle is a passenger vehicle or a truck) using an image feature of the target vehicle included in the image. The vanishing point estimation apparatus may detect the target vehicle from the image of the current time point based on the classified type.

In operation 420, the vanishing point estimation apparatus may determine a bounding box (e.g., a bounding box 515 in FIG. 5A) corresponding to a rear side of the target vehicle based on the classified type. For example, the vanishing point estimation apparatus may retrieve width information prestored for each vehicle type. A width of a vehicle may be in a range between 1600 millimeters (mm) and 2500 mm according to a vehicle type. For example, when the type of the target vehicle is determined to be a passenger vehicle, a retrieved full width of the target vehicle may be approximately 1800 mm. For another example, when the type of the target vehicle is determined to be a truck, a retrieved full width of the target vehicle may be approximately 2500 mm. The vanishing point estimation apparatus may generate a bounding box corresponding to the width of the target vehicle based on the width information. The bounding box may be generated by, for example, an artificial intelligence (AI) algorithm including machine learning and deep learning. The vanishing point estimation apparatus may detect the target vehicle, or the rear side of the target vehicle, using the bounding box. A non-limiting example of a result of the detecting performed in operation 420 may be illustrated in FIG. 5A.

In operation 430, the vanishing point estimation apparatus may track positions of the objects in a world coordinate system by associating the objects detected in operation 420 and current position coordinates of the objects estimated from images of previous time points that precede the current time point. The term "associating" or "association" used herein may be construed as a process of matching an object detected in an image of a current time point to an object estimated from an image of a previous time point.

For example, the vanishing point estimation apparatus may predict positions of second bounding boxes corresponding to the estimated current position coordinates using a Kalman filter. The Kalmann filter may be an algorithm used to track or estimate an optimal value of a current state using accumulated previous data and a newly measured value. The Kalman filter may repeatedly perform state prediction and measurement updates to predict a current position of an object.

In one example, the Kalmann filter may predict a current position and speed (e.g., current position coordinates (X, Y) and an X-direction speed and a Y-direction speed) of a target vehicle based on a measured value including a width of the target vehicle in an image of a current time point and a distance in a horizontal direction from a center of the width of the target vehicle, and may estimate current position coordinates of the target vehicle. The vanishing point estimation apparatus may predict a position of a second bounding box corresponding to the estimated current position coordinates of the target vehicle using the Kalmann filter. The estimated current position coordinates of the target vehicle may correspond to a position of a lower center point of the second bounding box. For example, the vanishing point estimation apparatus may generate a second bounding box by identifying a full height and/or a full width from a type of a vehicle, applying the full height and/or the full width to a position of a lower center point of the second bounding box.

In operation 430, the vanishing point estimation apparatus may match first bounding boxes corresponding to the objects and the second bonding boxes. The vanishing point estimation apparatus may track the positions of the objects in the world coordinate system based on a result of the matching. A non-limiting example of a result of tracking the positions of the objects in the world coordinate system in operation 430 by the vanishing point estimation apparatus may be illustrated in FIG. 5B.

In operation 440, the vanishing point estimation apparatus may estimate a vanishing point for each of the objects based on the positions of the objects tracked in operation 430. For example, the vanishing point estimation apparatus may estimate a vanishing point of an object among objects based on a relationship between a position of a first bounding box corresponding to the object, a height of a camera capturing an image of the objects, and a position of a third bounding box corresponding to the object in an image plane. The image plane may refer to a two-dimensional (2D) area into which a real world is projected through the camera of the vanishing point estimation apparatus. Since the image plane is the 2D area, the image plane may have a coordinate system that is divided by pixel unit. The coordinate system of the image plane may be referred to herein as an image coordinate system. For example, when an upper left end of the image plane is set as an origin, a rightward direction may be indicated as an x-axis, and a downward direction may be indicated as a y-axis. The vanishing point estimation apparatus may project a tracking result in the world coordinate system onto the image plane, for example, an image plane 530 illustrated in FIG. 5C.

For example, the vanishing point estimation apparatus may estimate a vanishing point of an object among objects based on a relationship among a center position of a lower end of a bounding box corresponding to the object, a height $h_c$ of a camera capturing an image of the objects, and a position of a bottom edge of a bounding box corresponding to the object in the image plane. A non-limiting example method of estimating a vanishing point of each object by the vanishing point estimation apparatus will be described in detail with reference to FIGS. 5A through 5C.

In operation 450, the vanishing point estimation apparatus may output the vanishing point estimated for each of the objects in operation 440. The vanishing point estimation apparatus may project the objects onto the image of the current time point by the vanishing point estimated for each of the objects.

In an example, the vanishing point estimation apparatus may calculate a distance between each of the objects and the vanishing point estimated for each of the objects based on the vanishing point estimated for each of the objects and output the calculated distance.

In another example, the vanishing point estimation apparatus may generate driving assistance information including, for example, driving lanes, driving lines, road surface signs, and the like, that corresponds to each of the objects based on the vanishing point estimated for each of the objects. That is, the vanishing point estimation apparatus may calculate the distance between each of the objects and the vanishing point estimated for each of the objects based on the vanishing point estimated for each of the objects. Based on the calculated distance, the vanishing point estimation apparatus may generate the driving assistance information including a driving lane and a driving line of each of the objects.

Figure 5A:
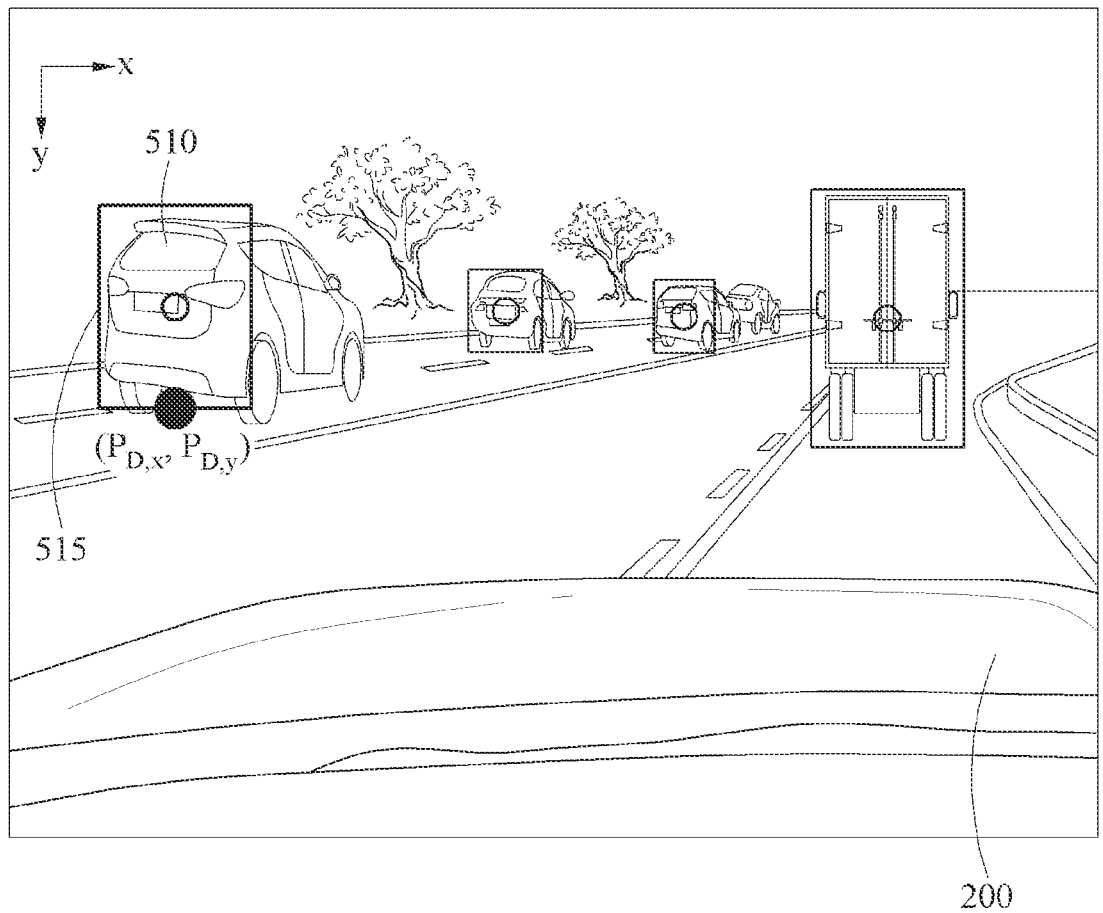
FIGS. 5A through 5C illustrate examples of tracking positions of objects.
Figure 5B:
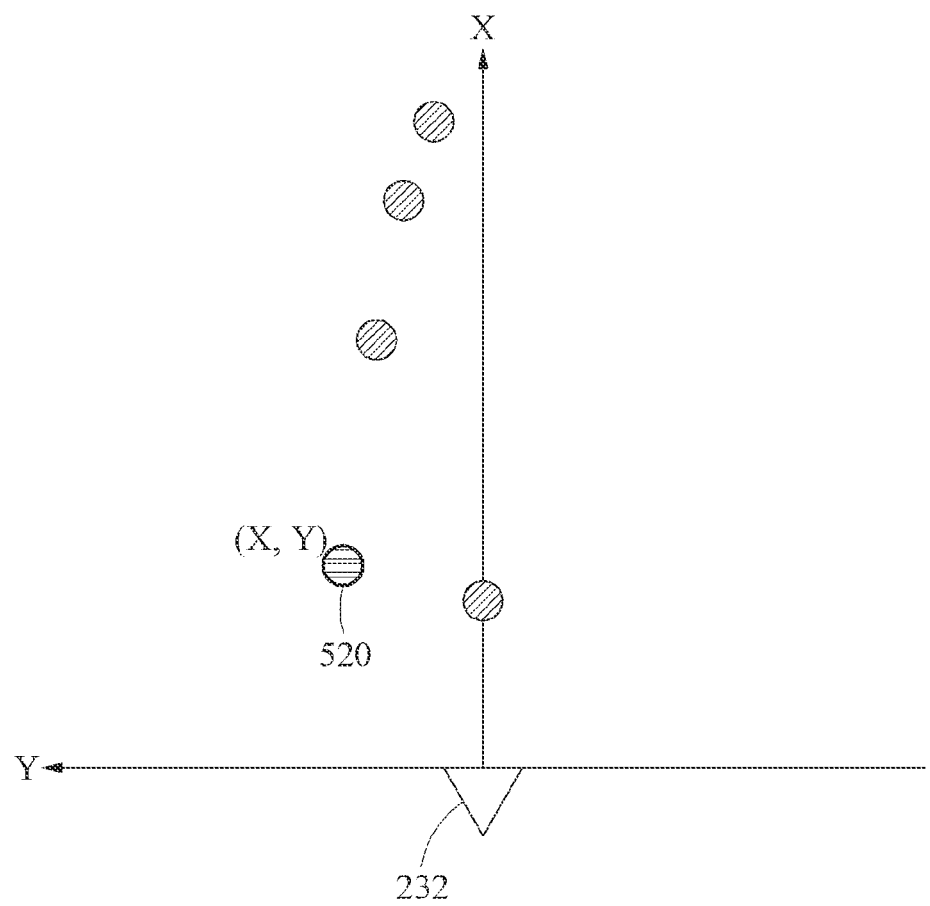
Figure 5C:
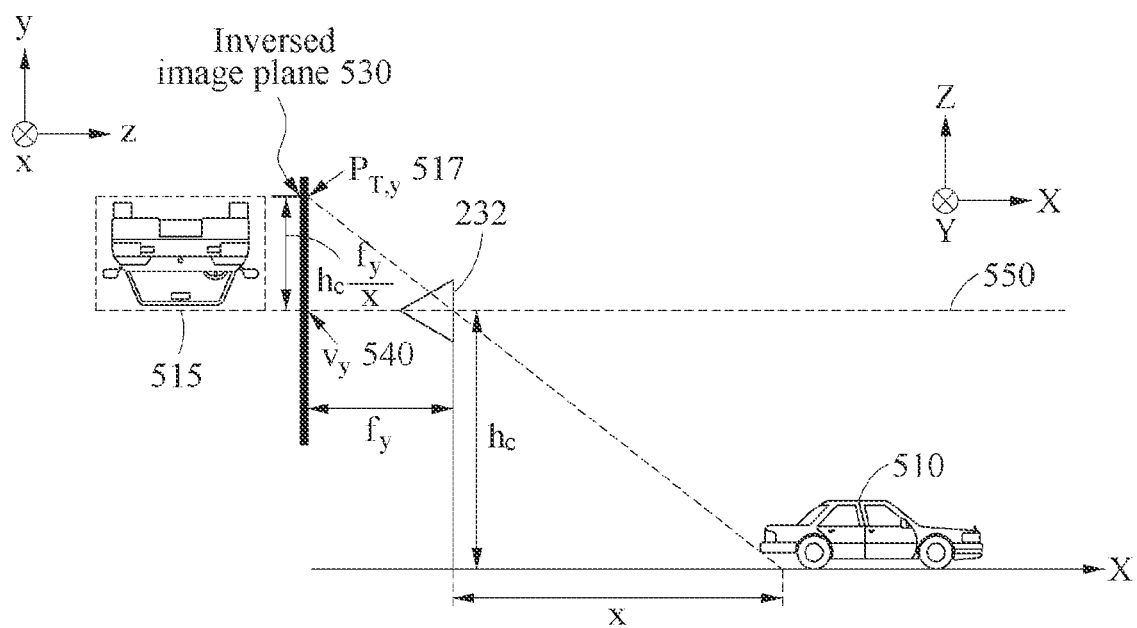

FIGS. 5A through 5C illustrate examples of tracking positions of objects. FIG. 5A illustrates an example of a result of detecting bounding boxes, FIG. 5B illustrates an example of a tracking result in a world coordinate system corresponding to an object detected in an image of FIG. 5A, and FIG. 5C illustrates an example of a result of projecting a tracking result in a world coordinate system onto an image plane.

A host vehicle 200 (for example, the host vehicle 200 of FIG. 2) in which a vanishing point estimation apparatus is embedded may classify a type of a target vehicle 510 illustrated in FIG. 5A based on an image of a current time point obtained through a camera, for example, the camera 232 of FIG. 2, and generate a bounding box 515 corresponding to a rear side of the target vehicle 510 based on the classified type. The vanishing point estimation apparatus may obtain coordinates ($p_{D,x}$, $p_{D,y}$) of a lower center of the rear side of the target vehicle 510 by the bounding box 515.

The vanishing point estimation apparatus may determine whether the target vehicle 510 travels on the same lane as the host vehicle 200 or on a neighboring lane. For example, when the target vehicle 510 is traveling on a left side ahead of the host vehicle 200, the bounding box 515 may be generated on a left side of the image obtained by the camera 232. When the target vehicle 510 is traveling on a right side ahead of the host vehicle 200, the bounding box 515 may be generated on a right side of the image obtained by the camera 232. In another example, when the target vehicle 510 is traveling on the same lane as the host vehicle 200 ahead of the host vehicle 200, the bounding box 515 may be generated near a center of the image obtained by the camera 232. Thus, the vanishing point estimation apparatus may determine whether the target vehicle 510 is traveling on the same lane as the host vehicle 200 ahead of the host vehicle 200 by comparing the bounding box 515 in the image obtained by the camera 232 and a position of an x-axis center of the image obtained by the camera 232.

A tracking result in a world coordinate system obtained by tracking an object (for example, the target vehicle 510) detected in the image of FIG. 5A by the bounding box 515 may be illustrated in FIG. 5B. The tracking result in the world coordinate system of the target vehicle 510 may be indicated as a point in a vehicle coordinate system.

The coordinates ($p_{D,x}$, $p_{D,y}$) of the lower center of the rear side of the target vehicle 510 illustrated in FIG. 5A may be indicated as, for example, position coordinates (X, Y) 520 in the world coordinate system or the vehicle coordinate system in FIG. 5B.

For example, the vanishing point estimation apparatus may obtain a y-coordinate $p_{T,y}$ 517 of a lower center point $p_T$ of the rear side of the target vehicle 510 in the image illustrated in FIG. 5A from a position ($v_x$, $v_y$) of a vanishing point corresponding to the target vehicle 510, a height $h_c$ of the camera 232, a focal length ($f_x$, $f_y$), and the position coordinates (X, Y) 520 of the target vehicle 510 in the vehicle coordinate system. Such a relationship may be expressed by Equation 1 below, for example.

$$p_{T,y} = v_y + h_c \frac{f_y}{X} \quad \text{Equation 1}$$

The lower center point $p_T$ of the rear side of the target vehicle 510 illustrated in FIG. 5A is the same as a lower center coordinate $p_D$ of the bounding box 515 of the rear side of the target vehicle 510, and thus a relationship, for example, $p_{D,y}=p_{T,y}$, may be established. Thus, the vanishing point estimation apparatus may obtain a position $v_y$ in a y-axis direction of a vanishing point 540 illustrated in FIG. 5C as expressed by Equation 2 below, for example.

$$v_y = p_{D,y} - h_c \frac{f_y}{X}$$ Equation 2

A magnitude of a y-axis component of the vanishing point 540 may be determined by the height $h_c$ of the camera 232 or, for example, a camera lens.

Figure 6:
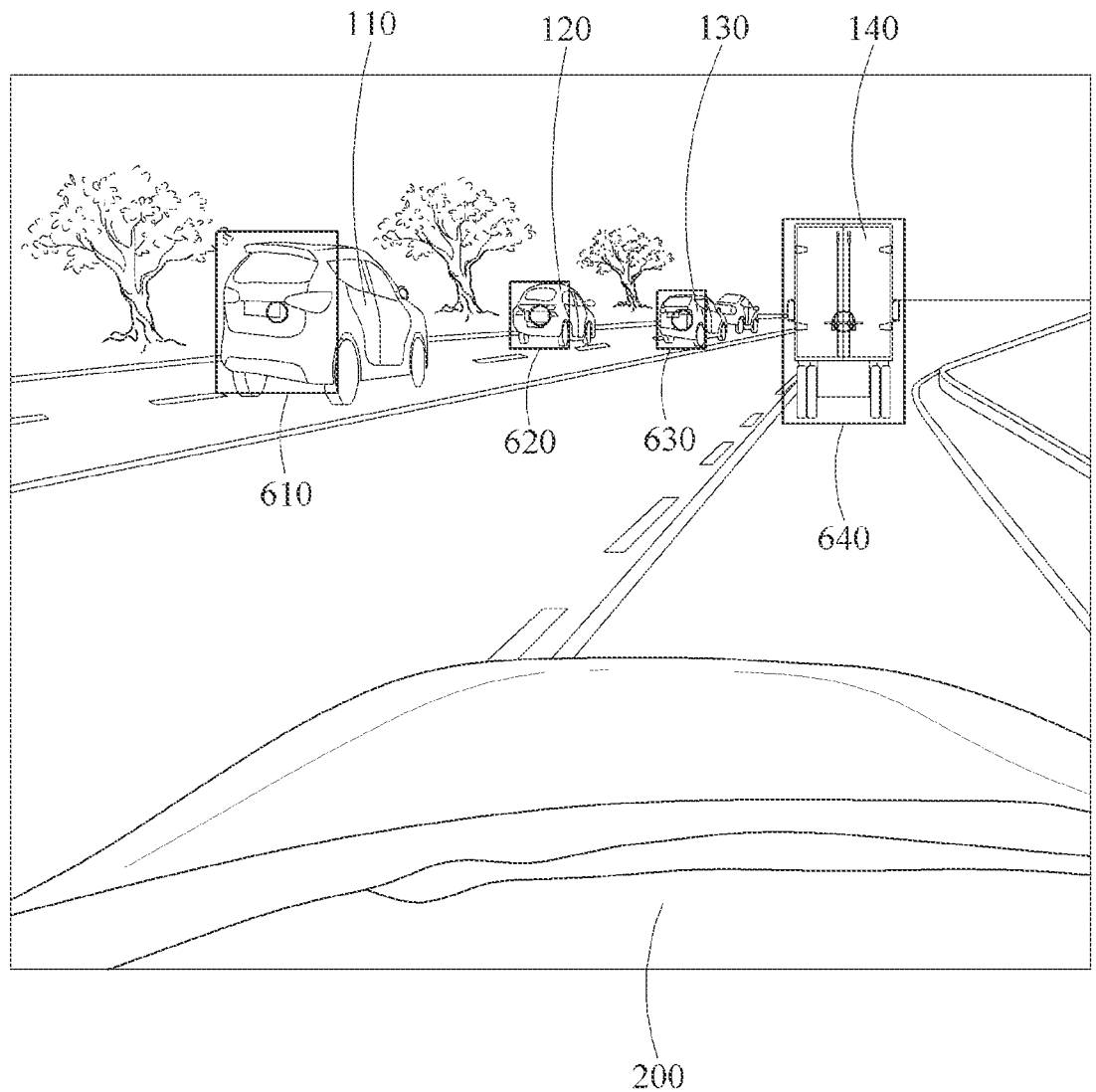
FIG. 6 illustrates an example of a result of tracking objects using an estimated vanishing point.

The vanishing point estimation apparatus of one or more embodiments may obtain a position of the vanishing point 540 even without searching for a straight line from the image through the process described with reference to FIGS. 5A and 5B, and may accurately estimate a vanishing point for each object as illustrated in FIG. 6.

Hereinafter, projecting, onto the image plane 530, the tracking result in the world coordinate system obtained as described above with reference to FIG. 5B will be described in detail with reference to FIG. 5C, as a non-limiting example.

A shape of the target vehicle 510 may be incident on or input to an image sensor through a lens of the camera 232. The lens of the camera 232 may be physically separated from the image sensor, and a distance therebetween may correspond to a focal length $f_y$. The lens of the camera 232 may be disposed by a preset distance corresponding to the height $h_c$ from the ground on which the target vehicle 510 is positioned. For example, when the camera 232 is disposed on an upper cover of the host vehicle 200, the preset distance may correspond to a full height of the host vehicle 200. For another example, when the camera 232 is disposed inside the host vehicle 200, the preset distance may correspond to a value less than the full height.

The image sensor may receive light 550 incident through the lens of the camera 232 and generate the image plane 530. The light 550 incident through the lens of the camera 232 may form the vanishing point 540.

For example, when the camera 232 is a pinhole camera, a vertically inverted image of the target vehicle 510 may be projected onto the image plane 530. The vertically inverted image may be indicated in the bounding box 515 of the target vehicle 510.

When a position of the camera 232 is set as an origin in a world coordinate system, the target vehicle 510 may move by an initial straight distance X on an x-axis from the lens of the camera 232. The initial straight distance X may be expressed by Equation 3 below, for example.

$$X : f = h_c : \Delta y, \quad X = f \cdot \frac{h_c}{\Delta y}$$ Equation 3

In Equation 3, f denotes an intrinsic parameter of a camera and may correspond to a focal length $f_y$ described above. $\Delta y$ may correspond to a pixel distance between the vanishing point 540 and a bottom edge of the bounding box 515 in the image plane 530, that is, $$h_c \frac{f_y}{X}.$$

As described above, even when a vehicle is detected and lines or lanes, or other landmarks are not detected, the vanishing point estimation apparatus of one or more embodiments may still estimate a vanishing point from an image through the process described above.

FIG. 6 illustrates an example of a result of tracking objects using an estimated vanishing point. In the example of FIG. 6, a tracking result may be obtained through projection using a vanishing point estimated by the vanishing point estimation method herein in a case of a sloping road.

As described above, a vanishing point estimation apparatus of one or more embodiments may estimate a vanishing point for each of objects, for example, vehicles 110, 120, 130, and 140, and generate bounding boxes 610, 620, 630, and 640 at positions respectively corresponding to rear sides of the vehicles 110, 120, 130, and 140 based on the estimated vanishing point, thereby improving the accuracy of tracking the vehicles 110, 120, 130, and 140.

Figure 7:
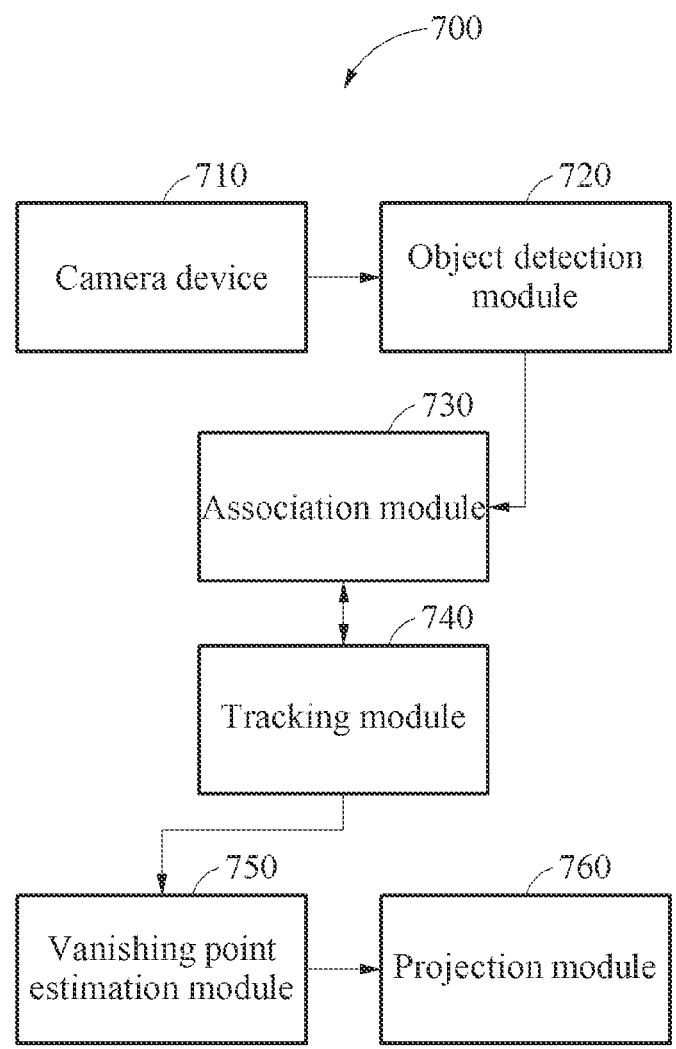
FIGS. 7 and 8 illustrate examples of a vanishing point estimation apparatus.

FIG. 7 illustrates an example of a vanishing point estimation apparatus. Referring to FIG. 7, a vanishing point estimation apparatus 700 may include a camera device 710, an object detection module 720, an association module 730, a tracking module 740, a vanishing point estimation module 750, and a projection module 760.

The camera device 710 may capture an image. The captured image may be an image of a current time point including objects. The objects may include a target vehicle.

The object detection module 720 may detect the objects included in the image captured by the camera device 710.

The association module 730 may associate or match the objects detected by the object detection module 720 with or to objects tracked by the tracking module 740.

The tracking module 740 may track the objects by estimating current position coordinates of the objects from images of previous time points that precede the current time point. The estimating module 740 may output a tracking result in a world coordinate system.

The vanishing point estimation module 750 may estimate a vanishing point for each of the objects based on positions of the objects that are based on a result of the matching by the association module 730, that is, a result of matching the objects detected from the image and the estimated current position coordinates of the objects.

The projection module 760 may project and display the vanishing point estimated for each of the objects by the vanishing point estimation module 750 onto the image captured by the camera device 710.

Figure 8:
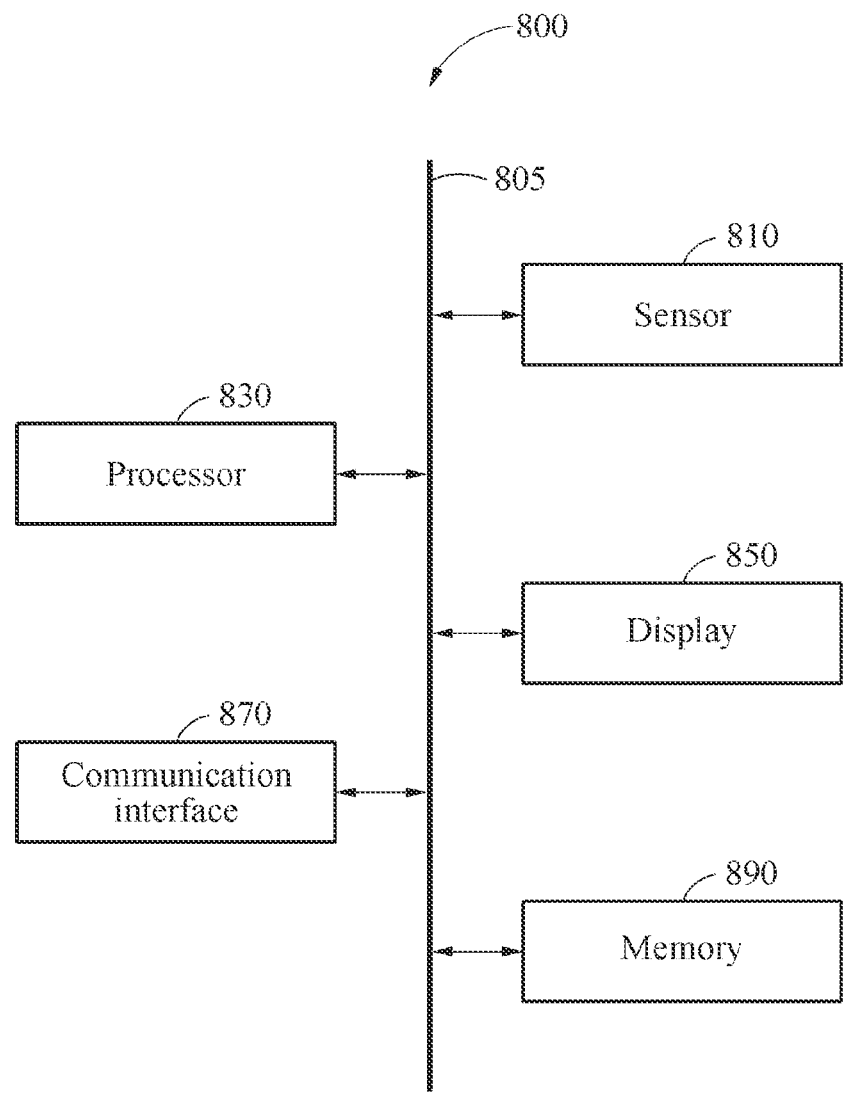

FIG. 8 illustrates another example of a vanishing point estimation apparatus. Referring to FIG. 8, a vanishing point estimation apparatus 800 may include a sensor 810, a processor 830 (e.g., one or more processors), a display 850, a communication interface 870, and a memory 890 (e.g., one or more memories). The sensor 810, the processor 830, the display 850, the communication interface 870, and the memory 890 may communicate with one another through a communication bus 805.

The sensor 810 may capture an image of a current time point of objects including a target vehicle. The sensor 810 may be, for example, a camera sensor, an image sensor, or a vision sensor, but examples of which may not be limited thereto.

The processor 830 may detect the objects in the image of the current time point. The processor 830 may track positions of the objects in a world coordinate system by associating the objects with current position coordinates of the objects estimated from images of previous time points that precede the current time point. The processor 830 may estimate a vanishing point for each of the objects based on the positions of the objects.

In addition, the processor 830 may perform at least one of the methods, processes, and operations described above with reference to FIGS. 1 through 7 or an algorithm corresponding to the at least one method, process, and operation. The processor 830 may be a hardware-implemented estimation device having a physically structured circuit for executing desired operations. The desired operations may include, for example, instructions or a code in a program. The hardware-implemented estimation device may include, for example, a microprocessor, a central processing unit (CPU), a processor core, a multi-core processor, a multiprocessor, an application-specific integrated circuit (ASIC), and a field-programmable gate array (FPGA).

The processor 830 may execute a program and control the vanishing point estimation apparatus 800. A code of the program executed by the processor 830 may be stored in the memory 890.

The display 850 may display the vanishing point estimated for each of the objects by the processor 830.

The communication interface 870 may output the vanishing point estimated for each of the objects by the processor 830 to an outside of the vanishing point estimation apparatus 800.

The memory 890 may store the image of the current time point captured by the sensor 810 and/or the objects detected in the image of the current time point by the processor 830. The memory 890 may also store the current position coordinates of the objects estimated from the images of the previous time points by the processor 830 and/or the positions of the objects in the world coordinate system tracked by the processor 830.

The memory 890 may also store various sets of information generated during the processing of the processor 830. The memory 890 may also store various types of data and programs. The memory 890 may include a volatile or nonvolatile memory device. The memory 890 may include a mass storage medium such as a hard disk to store various types of data.

The vanishing point estimation apparatuses, host vehicles, vehicle controllers, cameras, ISPs, camera devices, object detection modules, association modules, tracking modules, vanishing point estimation modules, projection modules, sensors, processors, displays, communication interfaces, memories, communication buses, host vehicle 200, vehicle controller 210, vanishing point estimation apparatus 230, camera 232, ISP 235, vanishing point estimation apparatus 700, camera device 710, object detection module 720, association module 730, tracking module 740, vanishing point estimation module 750, projection module 760, vanishing point estimation apparatus 800, sensor 810, processor 830, display 850, communication interface 870, memory 890, communication bus 805, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with vanishing point estimation, comprising:
    detecting objects in an image of a current time point of the objects comprising a target vehicle;
    tracking positions of the objects in a world coordinate system by associating the objects with current position coordinates of the objects determined from images of previous time points that precede the current time point;
    determining a vanishing point for each of the objects including the target vehicle based on the positions of the objects; and
    outputting the vanishing point determined for each of the objects.

2. The method of claim 1, wherein the detecting of the objects comprises:
    classifying a type of the target vehicle; and
    detecting the target vehicle in the image of the current time point based on the classified type.

3. The method of claim 2, wherein the detecting of the target vehicle comprises:
    determining a bounding box corresponding to a rear of the target vehicle based on the classified type; and
    detecting the target vehicle using the bounding box.

4. The method of claim 3, wherein the determining of the bounding box comprises:
    retrieving prestored width information corresponding to the classified type; and
    generating the bounding box corresponding to a width of the target vehicle based on the width information.

5. The method of claim 1, wherein the tracking of the positions of the objects comprises:
    predicting positions of second bounding boxes corresponding to the determined current position coordinates using a Kalman filter;
    matching first bounding boxes corresponding to the objects and the second bounding boxes; and
    tracking the positions of the objects in the world coordinate system based on a result of the matching.

6. The method of claim 5, wherein the Kalman filter is used to determine a position of a second bounding box corresponding to current position coordinates of the target vehicle by predicting the current position coordinates of the target vehicle and a speed in x and y directions of the target vehicle based on a measurement value comprising a width of the target vehicle in the image of the current time point and a distance in a horizontal direction from a center of the width.

7. The method of claim 1, wherein the determining of the vanishing point comprises:
    determining a vanishing point of an object among the objects based on a relationship between a position of a first bounding box corresponding to the object, a height of a camera capturing the image of the objects, and a position of a third bounding box corresponding to the object in an image plane.

8. The method of claim 1, wherein the outputting of the vanishing point further comprises:
    projecting and displaying the objects onto the image of the current time point by the vanishing point determined for each of the objects.

9. The method of claim 1, further comprising:
    calculating a distance between the vanishing point for each of the objects based on the vanishing point determined for each of the objects; and
    outputting the calculated distance.

10. The method of claim 1, further comprising:
    generating driving assistance information corresponding to each of the objects based on the vanishing point determined for each of the objects.

11. The method of claim 10, wherein the generating of the driving assistance information comprises:

calculating a distance between the vanishing point for each of the objects and each of the objects, based on the vanishing point determined for each of the objects; and generating the driving assistance information comprising a driving line and a driving lane of each of the objects based on the calculated distance.

12. A non-transitory computer-readable storage medium storing instructions that, when executed by a processor, configure the processor to perform the method of claim 1.

13. An apparatus with vanishing point estimation, comprising:
a processor configured to:
  detect objects in an image of a current time point of the objects comprising a target vehicle;
  track positions of the objects in a world coordinate system by associating the objects with current position coordinates of the objects determined from images of previous time points that precede the current time point; and
  determine a vanishing point for each of the objects including the target vehicle based on the positions of the objects; and
a display configured to output the vanishing point determined for each of the objects.

14. The apparatus of claim 13, wherein, for the detecting of the objects, the processor is configured to:
classify a type of the target vehicle; and
detect the target vehicle in the image of the current time point based on the classified type.

15. The apparatus of claim 14, wherein, for the detecting of the target vehicle, the processor is configured to:
determine a bounding box corresponding to a rear of the target vehicle based on the classified type; and
detect the target vehicle using the bounding box.

16. The apparatus of claim 15, wherein, for the determining of the bounding box, the processor is configured to:
retrieve prestored width information corresponding to the classified type; and
generate the bounding box corresponding to a width of the target vehicle based on the width information.

17. The apparatus of claim 13, wherein, for the tracking of the positions of the objects, the processor is configured to:
predict positions of second bounding boxes corresponding to the determined current position coordinates using a Kalman filter;
match first bounding boxes corresponding to the objects and the second bounding boxes; and
track the positions of the objects in the world coordinate system based on a result of the matching.

18. The apparatus of claim 17, wherein the Kalman filter is used to determine a position of a second bounding box corresponding to current position coordinates of the target vehicle by predicting the current position coordinates of the target vehicle and a speed in x and y directions of the target vehicle based on a measurement value comprising a width of the target vehicle in the image of the current time point and a distance in a horizontal direction from a center of the width.

19. The apparatus of claim 13, wherein, for the determining of the vanishing point, the processor is configured to:
determine a vanishing point of an object among the objects based on a relationship between a position of a first bounding box corresponding to the object, a height of a camera capturing the image of the objects, and a position of a third bounding box corresponding to the object in an image plane.

20. The apparatus of claim 13, wherein, for the outputting of the vanishing point,
the processor is configured to project the objects onto the image of the current time point by the vanishing point determined for each of the objects, and
the display is configured to display the projected objects.

21. A method with vanishing point estimation, comprising:
determining a lower edge of bounding box of an object in an image;
determining a position of the object in a world coordinate system based on the lower edge of the bounding box;
determining a vanishing point of the object based on the lower edge of the bounding box and the position of the object in the world coordinate system; and
outputting the vanishing point of the object.

22. The method of claim 21, wherein
the determining of the lower edge comprises determining coordinates of a lower center of the bounding box, and
the determining of the vanishing point of the object comprises determining a position of the vanishing point in a vertical direction based on the coordinates of the lower center of the bounding box, the position of the object in the world coordinate system, and one or more intrinsic parameters of a camera used to obtain the image.

23. The method of claim 21, wherein the determining of the position of the object in the world coordinate system comprises:
matching the bounding box and a second bonding box; and
determining the position of the object in the world coordinate system based on a result of the matching.

24. The method of claim 23, wherein
the bounding box is generated by classifying a type of the object, and
the second bounding box is generated using a Kalmann filter.

* * * * *